(12) United States Patent
Holland et al.

(10) Patent No.: US 9,671,621 B2
(45) Date of Patent: Jun. 6, 2017

(54) DEFORMABLE MEMBRANE ASSEMBLIES

(71) Applicant: Adlens Ltd., Oxford (GB)

(72) Inventors: Benjamin Thomas Tristram Holland, Oxford (GB); Daniel Paul Rhodes, Kidlington (GB); Conor Briody, Oxford (GB); Thomas Norman Llyn Jacoby, Oxford (GB); Jon Nisper, Oxford (GB); Robert Edward Stevens, Oxford (GB)

(73) Assignee: Adlens Limited (GB)

( * ) Notice: Subject to any disclaimer, the term of this patent is extended or adjusted under 35 U.S.C. 154(b) by 0 days.

(21) Appl. No.: 15/025,188

(22) PCT Filed: Sep. 25, 2014

(86) PCT No.: PCT/EP2014/070473
§ 371 (c)(1),
(2) Date: Mar. 25, 2016

(87) PCT Pub. No.: WO2015/044260
PCT Pub. Date: Apr. 2, 2015

(65) Prior Publication Data
US 2016/0223837 A1   Aug. 4, 2016

(30) Foreign Application Priority Data

Sep. 27, 2013  (GB) .................................. 1317216.8

(51) Int. Cl.
*G02C 7/02* (2006.01)
*G02B 3/12* (2006.01)
(Continued)

(52) U.S. Cl.
CPC ............... *G02C 7/085* (2013.01); *G02B 3/14* (2013.01); *G02B 26/004* (2013.01); *G02B 26/0825* (2013.01)

(58) Field of Classification Search
CPC ............. G02B 3/12; G02B 3/14; G02C 7/085
(Continued)

(56) References Cited

U.S. PATENT DOCUMENTS 5,108,429 A * 4/1992 Wiley .................. A61F 2/1613
623/6.22
5,371,629 A 12/1994 Kurtin et al.
(Continued)

OTHER PUBLICATIONS

International Search Report Issued in PCT/EP2014/070473 on Jan. 8, 2015.

*Primary Examiner* — Darryl J Collins
(74) *Attorney, Agent, or Firm* — Mintz Levin Cohn Ferris Glovsky and Popeo, P.C.

(57) ABSTRACT

A deformable membrane assembly comprises a deformable membrane (70) in contact with a body of fluid (90) and a selectively operable adjuster for adjusting the pressure of the fluid (90) for causing distension of the membrane (70) in accordance with a predefined form. The membrane is held peripherally by a bendable supporting member (50) that is coupled to a fixed support by at least three engaging members (82) at spaced locations round the supporting member (50). An engaging member (82) is provided at or proximate at least one point round the supporting member (50) where the profile of the supporting member (50) corresponding to the predefined form of the membrane (70) exhibits locally maximum or minimum curvature in the direction of distension of the membrane (70).

17 Claims, 20 Drawing Sheets

(51) Int. Cl.
*G02B 1/06* (2006.01)
*G02C 7/08* (2006.01)
*G02B 3/14* (2006.01)
*G02B 26/00* (2006.01)
*G02B 26/08* (2006.01)

(58) Field of Classification Search
USPC ............... 359/665–667; 351/159.34, 159.68
See application file for complete search history.

(56) References Cited

U.S. PATENT DOCUMENTS

| | | | |
|---|---|---|---|
| 5,956,183 A | 9/1999 | Epstein et al. | |
| 7,646,544 B2 * | 1/2010 | Batchko | G02B 3/14 359/665 |
| 2003/0095336 A1 | 5/2003 | Floyd | |
| 2010/0118413 A1 | 5/2010 | Kim et al. | |
| 2010/0182703 A1 | 7/2010 | Bolis | |
| 2010/0195213 A1 * | 8/2010 | Bolis | G02B 3/14 359/666 |
| 2011/0032624 A1 * | 2/2011 | Bolis | B81B 3/0021 359/666 |
| 2011/0085243 A1 | 4/2011 | Gupta et al. | |

\* cited by examiner

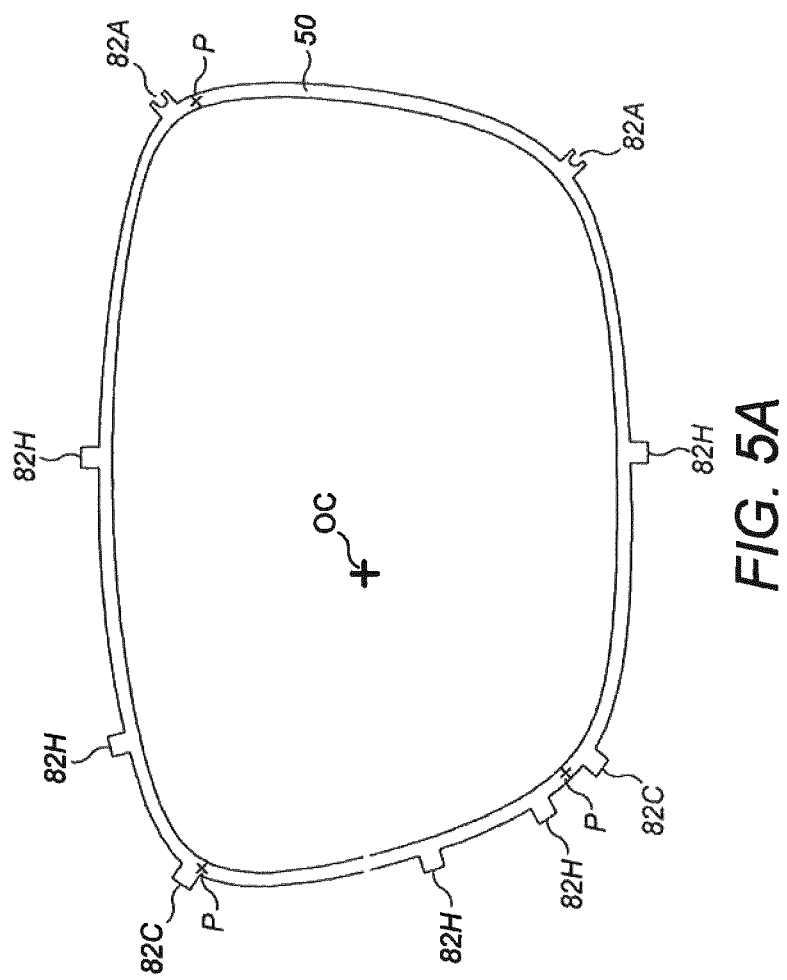

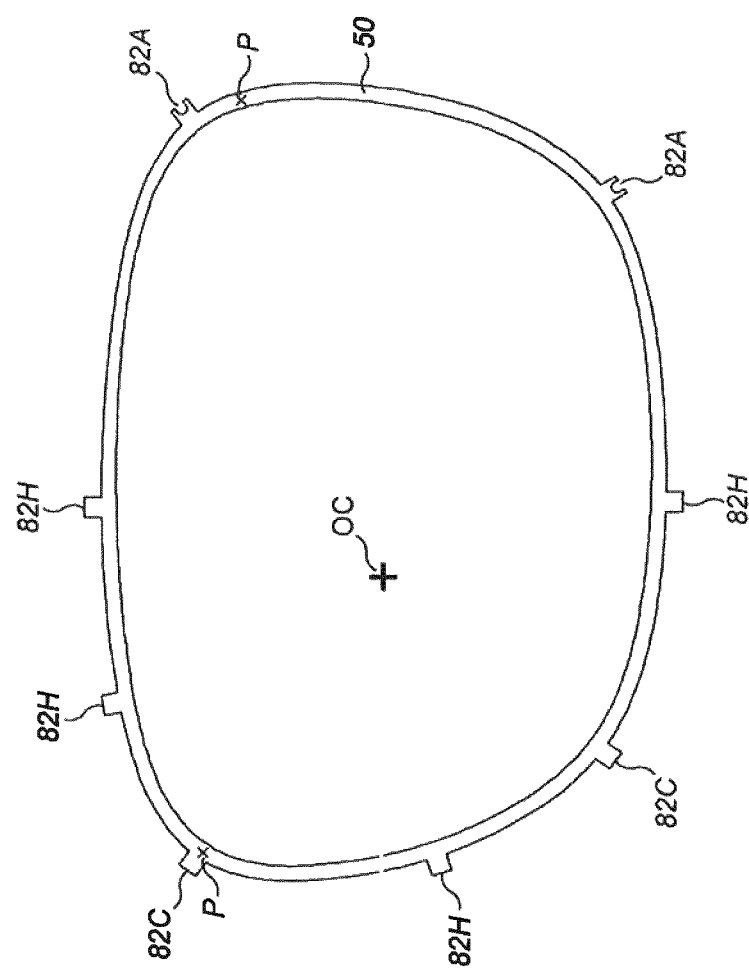

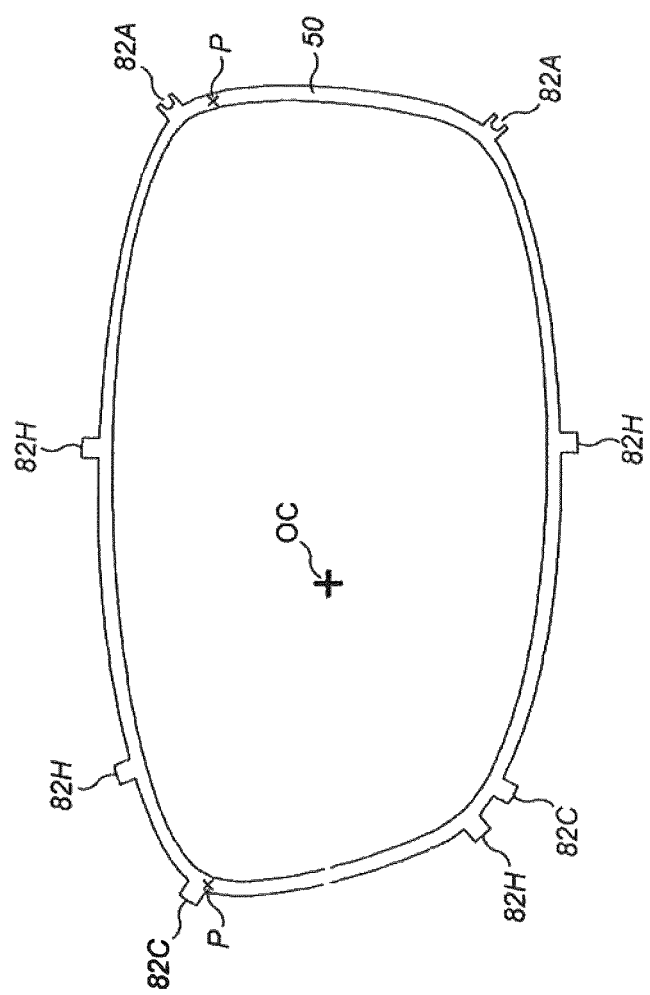

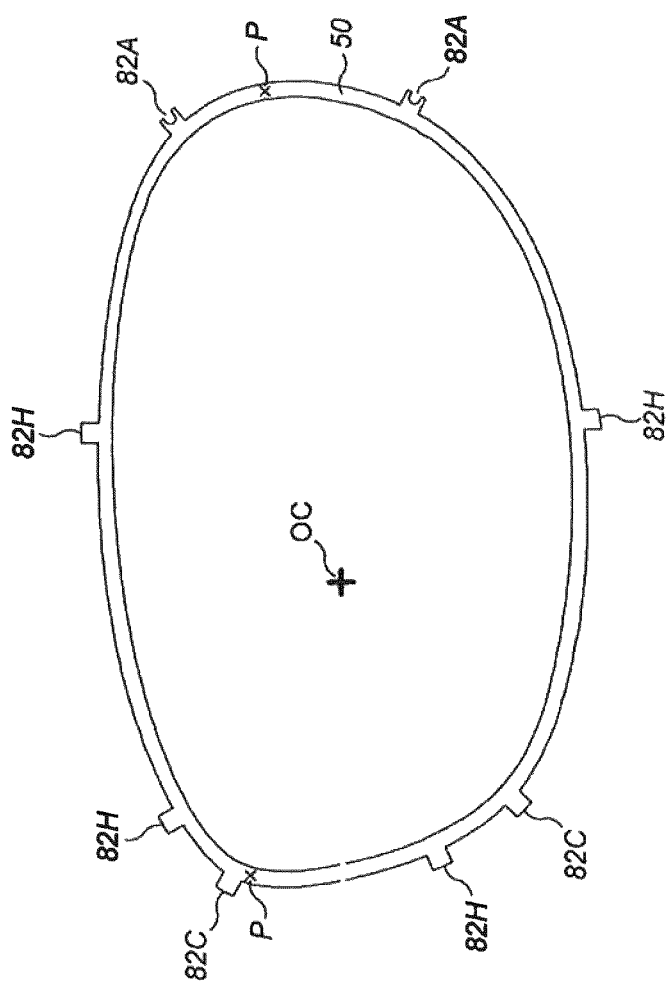

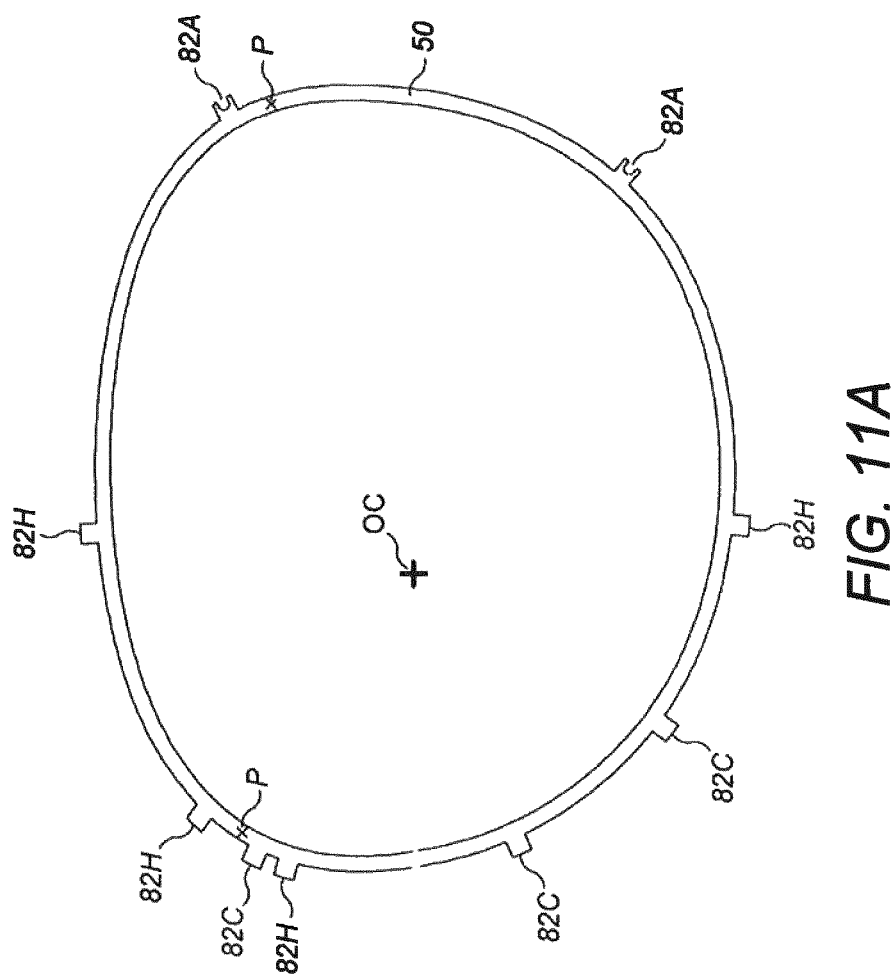

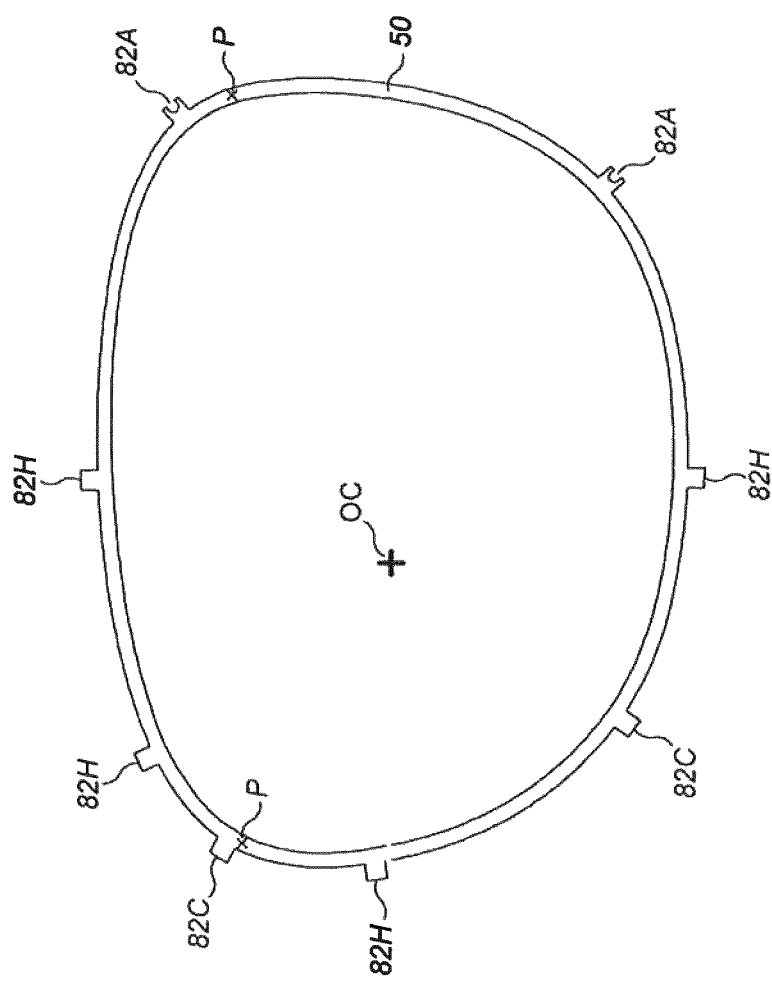

DEFORMABLE MEMBRANE ASSEMBLIES

CROSS-REFERENCE TO RELATED APPLICATIONS

The present application claims priority to and is a national stage application, filed under 35 U.S.C. §371, of International Application No. PCT/EP2014/070473, filed on Sep. 25, 2014, which claims priority to GB Application No. 1317216.8, filed on Sep. 27, 2013, the contents of which fully incorporated herein by reference in their entireties.

TECHNICAL FIELD

Co-pending international patent applications PCT/GB2012/051426, PCT/EP2012/075549 and PCT/GB2013/050747, the contents of which are incorporated herein by reference, disclose deformable membrane assemblies in which the shape of an elastic membrane may be controlled by adjusting the pressure of fluid within an envelope, the membrane forming one wall of the envelope. The fluid pressure may be adjusted by controlling the volume of fluid within the envelope, or by controlling the volume of the envelope itself while keeping the volume of fluid constant, or by a combination of both of these. Upon actuation, if the pressure of fluid within the envelope is increased, the membrane distends outwardly ("inflates") relative to the envelope. If the pressure of fluid within the envelope is decreased, the membrane is drawn inwardly ("deflates") relative to the envelope. The locus of movement of each point on the membrane defines an "out-of-plane" z-axis.

The present invention relates to deformable membrane assemblies, particularly assemblies comprising an elastic membrane, the shape of which maybe controlled by adjusting the pressure of a body of fluid in contact with at least one face of the membrane. The invention has particular reference to fluid-filled lenses and mirrors having an adjustable refractive power.

The envelope is mounted on a fixed support, and the membrane is supported around its edge by a flexible membrane supporting member, which typically comprises a bendable ring. The support member, or ring, is coupled to the fixed support at a plurality of control points by respective engaging members that are spaced round the ring for controlling the profile of the ring as the pressure of the fluid in the envelope is adjusted. In accordance with PCT/GB2012/051426, at least three control points should be provided round the ring, which is necessary to hold the ring stably in three dimensions. Except at the control points, where the position of the ring is determined by the engaging members, the ring is unconstrained.

The ring is required to bend as the shape of the membrane is adjusted, so that the profile of the ring complies with the desired membrane shape, and the ring serves to control the deformation of the membrane. In the case of a circular membrane that is required to deform purely spherically, no change in the shape of the ring is needed. However, where the membrane is desired to adopt a non-spherical shape, or where the membrane is non-circular (which is common in eyeglass lenses), the profile of the ring must change as the membrane shape changes in order to maintain and control the fidelity of the desired membrane shape.

In the case of eyeglass lenses, for example, the membrane must deform in accordance with one or more Zernike polynomials, where a predominant spherical bending mode (second order defocus, $Z_2^0$) may be superposed by one or more selected other second, third or even fourth order Zernike polynomials to introduce one or more deviations from spherical selected from astigmatism, coma and trefoil to afford the usual range of lens shapes required by optometrists.

The position of the ring at the control points is controlled by the control points themselves. However, between the control points, the bending stiffness of the ring may vary in a predetermined manner, so that as the membrane distends inwardly or outwardly, the ring bends in a way that corresponds to the desired membrane shape. As disclosed in earlier PCT/GB2012/051426 and PCT/GB2013/050747, the variation in the bending stiffness of the ring round its extent that is required to produce a predefined membrane form may be calculated iteratively using static or dynamic finite element analysis, depending on the end-use of the membrane, such that the predefined membrane form is attained.

As the pressure of the fluid is adjusted, causing the membrane to distend relative to the envelope, a force is applied to the ring by the engaging member at each control point. In some embodiments, the position of the ring may be actively adjusted on the z-axis at one or more of the control points (termed "actuation points") for changing the volume of the envelope, thereby to adjust the pressure of the fluid in the envelope. One or more other control points (termed "hinge points") may be stationary relative to the fixed support and serve to locate the ring at that point relative to the fixed support and, in some cases, counteract undesired bending modes as disclosed by PCT/GB2013/050747. Suitably, from a manufacturing point of view, it is desirable that the forces applied at all of the control points should act in the same direction, although this is not essential.

When the membrane is required to adopt a predefined non-planar form, the corresponding desired ring profile is likewise in general non-planar (except in cases such as a circular membrane deforming purely spherically or a lens surface with constant ratio of astigmatism to spherical power using a flat elliptical boundary) and, depending on the predefined membrane form, may exhibit multiple turning points (i.e. points of locally maximum amplitude) in opposite directions on the z-axis. In some situations, the forces applied to the ring may act in opposite directions at adjacent control points, so there will be an inflection point in the ring profile between such control points. PCT/GB2012/051426 teaches that there should be a control point located at or proximate each point on the ring where the ring profile that is needed to produce the predefined membrane form exhibits a turning point in the direction of the force applied at the control point between two adjacent points where the profile of the ring exhibits an inflection point or turning point in the opposite direction.

Usually, the force applied to the ring at each control point (actuation point or hinge point) will act on the z-axis in a direction opposite to the direction of distension of the membrane. Thus, in accordance with PCT/GB2012/051426 there should be a control point situated on the ring at each point where the profile of the ring that is required to produce the predefined form of membrane upon adjusting the pressure of the fluid within the envelope exhibits a turning point on the z-axis in the opposite direction to the direction of distension of the membrane, between two adjacent turning points in the ring profile in the direction of distension of the membrane.

Usually, the membrane will be pre-tensioned on the ring to counteract sagging and other gravitational effects. In some embodiments the membrane may be pre-tensioned to a strain of up to about 50%; pre-strains of between 0.5-50% or 5-40%, e.g. 20 or 30%, may be appropriate in some embodiments. The tension in the membrane is applied to the bendable ring. In accordance with the teaching of PCT/EP2012/075549, the assembly may further comprise a bending controller acting on the supporting member, or ring, to control the bending of the supporting member in response to loading through tension in the membrane. Suitably the bending controller may comprise a reinforcing diaphragm as disclosed in PCT/GB2012/051426, or a supporting plate, struts, levers, linkages, slides or bendable rods as disclosed in PCT/EP2012/075549 that serve to stiffen the ring against unwanted deformation modes in the planes orthogonal to the z-axis, while permitting the ring to bend substantially unhindered on the z-axis.

Deformable membrane assemblies according to the disclosures of PCT/GB2012/051426, PCT/EP2012/075549 and PCT/GB2013/050747 have been found to give satisfactory results. In particular, fluid-filled adjustable lens assemblies manufactured in accordance with the teachings of those disclosures can be made non-round whilst delivering a good optical performance across a range of refractive powers. Nevertheless, membrane assemblies produced in accordance with these disclosures may exhibit a small degree of optical distortion in some embodiments, especially towards the edges of the membrane at high refractive powers, where the curvature of the membrane is greatest.

Accordingly it is an object of the present invention to provide improvements in or relating to membrane assemblies of the kind described above whereby the fidelity of the membrane shape may be further enhanced.

SUMMARY

In accordance with the present invention therefore there is provided a deformable membrane assembly comprising a deformable membrane in contact with a body of fluid and a selectively operable adjuster for adjusting the pressure of the fluid for causing distension of the membrane in accordance with a predefined form, the membrane being held peripherally by a bendable supporting member that is coupled to a fixed support by at least three engaging members at spaced locations round the supporting member, there being an engaging member provided at or proximate to at least one point round the supporting member where the profile of the supporting member corresponding to the predefined form of the membrane exhibits locally maximum or minimum curvature in the direction of distension of the membrane.

By 'locally maximum curvature' is meant that the curvature of the supporting member (being the second derivative of the amplitude of displacement) exhibits a local peak in the direction of distension of the membrane. 'Locally minimum curvature' in the direction of distension of the membrane corresponds to locally maximum curvature in the opposite direction.

By 'proximate' is meant that the engaging member is positioned within ±10%, preferably ±5%, more preferably ±1%, and still more preferably or ±0.1% of the point where the profile of the supporting member exhibits locally maximum or minimum curvature as a percentage of the length of the periphery of the membrane where it is held by the supporting member.

Looked at another way, 'proximate' may be understood to mean that the curvature at the location of the engaging member is within 50%, preferably 66%, more preferably 90% and still more preferably 95% or 99% of the local peak curvature value, where the peak value is measured from the peak to the bottom of the shallower of the valleys on either side of the peak.

In some embodiments, there may be an engaging member at or proximate to at least one point round the supporting member where the profile of the supporting member corresponding to the predefined form of the membrane exhibits locally maximum curvature in the direction of distension of the membrane.

Suitably in some embodiments there may be an engaging member at or proximate to 2, 3, 4, 5, 6 or more points round the supporting member where the profile of the supporting member corresponding to the predefined form of the membrane exhibits locally maximum curvature in the direction of distension of the membrane. In some embodiments, there may be an engaging member at or proximate to each point round the supporting member where the profile of the supporting member corresponding to the predefined form of the membrane exhibits locally maximum curvature in the direction of distension of the membrane.

In some embodiments, depending on the required curvature of the supporting member, it may also be desirable to have at least one engaging member at or proximate to at least one point round the supporting member where the profile of the supporting member corresponding to the predefined form of the membrane exhibits locally minimum curvature in the direction of distension of the membrane.

The points of locally maximum or minimum curvature round the supporting member do not necessarily coincide with the points of locally maximum or minimum amplitude. In fact, generally they do not. Accordingly, the membrane assembly of the present invention typically comprises at least one control point at or proximate to a point on the supporting member that is a point of locally maximum or minimum curvature, but is not a point of locally maximum or minimum amplitude. More particularly, the membrane assembly of the present invention typically comprise at least one control point at a point on the supporting member that is a point of locally maximum or minimum curvature, but is not a point where the supporting member exhibits a turning point in the direction of the force applied at the control point between two adjacent points where the profile of the supporting member exhibits an inflection point or turning point in the opposite direction.

Unless the boundary of the membrane is circular and is required to deform purely spherically, the profile of the edge of the membrane where it is held by the supporting member must be altered as the membrane is distended, so as to cause or allow the membrane to adopt the predefined form. If the profile of the boundary does not correspond to the predefined form then the shape of the membrane will be distorted which is undesirable, especially for optical applications. In some embodiments, the pressure of the body of fluid may be adjusted by controlling the volume of fluid within an envelope, the deformable membrane forming one wall of the envelope. Alternatively, the volume of fluid within the envelope may be constant, and the pressure of the body of fluid may be adjusted by compressing or expanding the envelope, causing the membrane to distend inwardly or outwardly relative to the envelope. In each case, force must be applied to the supporting member at spaced locations round the boundary of the membrane to control the profile of the supporting member as the membrane distends.

For a given predefined membrane form, the required profile of the supporting member can be calculated. The amplitude of the required profile in the direction of distension of the membrane will vary round the supporting member, exhibiting points of locally maximum and minimum amplitude and locally maximum or minimum curvature. In accordance with the present invention, it has been found that applying force to the supporting member at or proximate to each point of locally maximum or minimum curvature in the direction of distension of the membrane allows the profile of the supporting member, and thus the shape of the membrane, to be controlled with increased accuracy and less distortion of the membrane shape.

According to the invention therefore an engaging member is provided at or proximate to each point round the supporting member where the profile of the supporting member that is required to control the distension of the membrane to the desired predefined form exhibits locally maximum or minimum curvature in the direction of distension of the membrane.

Suitably, there are at least three engaging members at spaced locations round the supporting member to stabilise the supporting member in three dimensions.

At least one of the engaging members may be arranged to hold the supporting member substantially stationary at or proximate to the respective point of locally maximum or minimum curvature. An engaging member of this kind effectively "hinges" the supporting member to the fixed support. In some embodiments, the assembly of the invention may comprise two or more hinging engaging members. In the case of a deformable membrane assembly in which distension of the membrane is caused by adjusting the volume of fluid within the envelope, all of the engaging members may be hinging engaging members.

In some embodiments, the adjuster for adjusting the pressure of the body of fluid may be operable for selectively compressing or expanding the envelope, and at least one of the engaging members may be connected to the adjuster for actively displacing the supporting member at or proximate to the respective point of locally maximum or minimum curvature relative to the fixed support for compressing or expanding the envelope. An engaging member of this kind is used for actuating the assembly to cause distension of the membrane. In some embodiments, the assembly may comprise two or more actuating engaging members.

Suitably, an engaging member may comprise a tab protruding from the supporting member. In the case of an actuating engaging member, the tab may be connected to a selectively operable actuating mechanism. In the case of a hinging engaging member, the tab may be fixedly secured to the fixed support, although a small degree of movement of the tab may be permitted to allow the supporting member to twist or otherwise move passively to allow the supporting member to adopt the required profile without significant unwanted distortion.

Suitably, the supporting member may comprise a bendable ring. The ring may be resiliently bendable. Advantageously, the bending stiffness of the ring may vary round its extent to control the bending of the ring be intermediate successive engaging members round the ring in response to distension of the membrane. The variation in bending stiffness of the ring that is required to ensure that the ring adopts a profile corresponding to the predefined membrane form when the membrane distends may be calculated by variety of different methods known to those skilled in the art, including finite element analysis as disclosed, for example, in PCT/GB2012/051426 and PCT/GB2013/050747, the contents of which are incorporated herein by reference.

In some embodiments, the edge of the membrane where it is held by the supporting member may be non-circular. As will be apparent, the supporting member may be substantially unconstrained between the engaging members.

In some embodiments, the predefined membrane form may be defined by a superposition of one or more Zernike polynomials. Suitably, the Arizona Fringe coefficient form of Zernike polynomials may be employed.

In some embodiments, the deformable membrane assembly may comprise a lens or mirror assembly in which the membrane is desired to deform in accordance with one or more Zernike polynomials suitably a predominant spherical bending mode (second order defocus, $Z_2^0$) may be superposed by one or more selected second, third and/or fourth order Zernike polynomials to introduce one or more deviations from spherical selected from astigmatism, coma and trefoil and afford the usual range of lens shapes required by optometrist. For use as a lens, the components of the assembly that lie within the field of vision should be optically clear, at least across the range of visible wavelengths, and preferably index matched.

Advantageously, one or more further engaging members may be located at or proximate points round the supporting member that are not points of locally maximum or minimum curvature, but remain substantially stationary as the membrane is distended. As disclosed in PCT/GB2013/050747, the use of such additional hinge points may assist in stabilising the supporting member against spontaneous deformation according to undesired bending modes. This may especially arise where the membrane is pre-tensioned on the supporting member. Suitably, hinge points positioned at or proximate to points of zero displacement as the membrane is distended may serve to suppress undesired bending modes in the supporting member that do not have a node round the whole supporting member.

The adjuster may be configured to adjust the pressure of the body of fluid over a range of pressures, including a minimum fluid pressure at which the membrane is at its least distended. In some embodiments, the membrane may be flat or substantially flat when the pressure of the body of fluid is at its minimum. Advantageously however, in some embodiments, the membrane may be distended even when the pressure of the fluid is at its minimum. This has also been found to assist in suppressing unwanted distortions in the shape of the supporting member and/or membrane.

In accordance with a different aspect of the present invention therefore there is provided a deformable membrane assembly comprising a deformable membrane in contact with a body of fluid and a selectively operable adjuster for adjusting the pressure of the fluid for causing distension of the membrane, wherein when the pressure of fluid is at a minimum, the membrane remains distended. As the pressure of fluid is increased, the membrane is distended further. By "distended" here is meant that the membrane may be distended inwardly or outwardly, the requirement being that the differential pressure across the membrane is always greater than a non-zero minimum.

In some embodiments, the membrane may be distended to form a lens or mirror surface having a refractive power in the range 0.1-1.0 dioptres when the pressure of the body fluid is at its minimum.

BRIEF DESCRIPTION OF THE DRAWINGS

Following is a description by way of example only with reference to the accompanying drawings of embodiments of the present invention.

In the drawings:

FIG. 5A is a front elevation of the front ring of the lens module of FIGS. 1-4.

FIGS. 6A-12A show, in front elevation, the front rings of seven different lens modules having different eye shapes from the lens module of FIGS. 1-4.

FIGS. 6B-12B and 6C-12C show, for each of the ring shapes of FIGS. 6A-12A, the graphs of amplitude variation and curvature variation corresponding to FIGS. 5B and 5C respectively.

DETAILED DESCRIPTION

Figure 1:
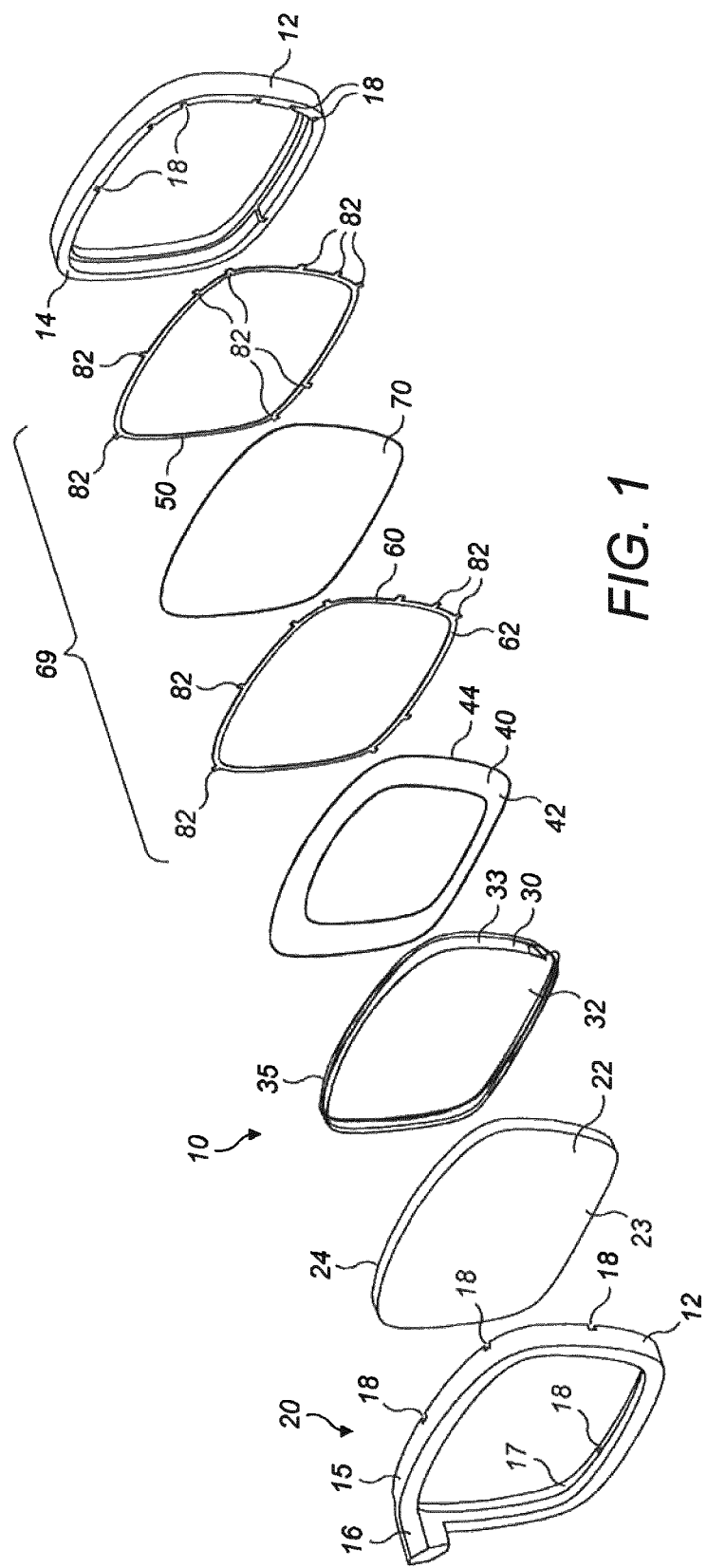
FIG. 1 is an exploded isometric view from above and to one side of the rear of a lens module of a pair of eyeglasses in accordance with the present invention.
Figure 2:
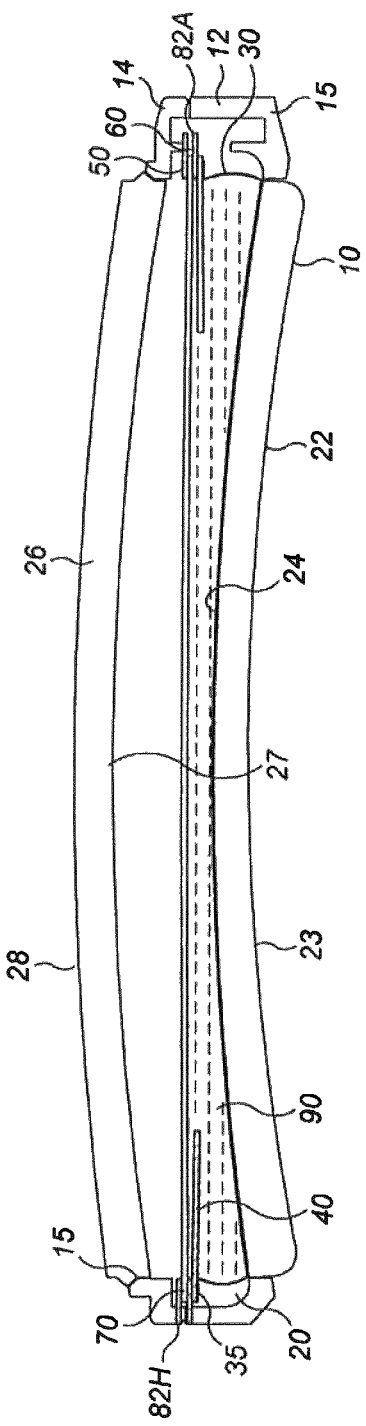
FIG. 2 is a sectional view through the assembled lens module of FIG. 1 in an unactuated state, with the adjuster omitted for clarity.

A lens module 10 according to the present invention is illustrated in exploded view in FIG. 1 and in cross-section in FIG. 2. The lens module 10 comprises a housing 12 consisting of front and rear retaining members 14, 15 respectively. The front and rear retaining members 14, 15 may be assembled together as shown in FIG. 2 to form a cavity 20 therebetween.

As can be seen, the lens module 10 is shaped to be accommodated within the left-hand side of a frame (not shown) of a pair of eyeglasses (UK: spectacles). In a pair of eyeglasses, two lens modules of this kind are provided—one for the left eye as shown, and one for the right eye. To all intents and purposes, the left and right and modules would be mirror images of one another. The rear retaining member 15 shown in FIG. 1 comprises a rearwardly extending protrusion 16 which accommodates part of an adjuster mechanism (not shown) which is described in more detail below. The protrusion 16 is shaped to be received within a correspondingly shaped recess formed in the left-hand temple arm (not shown) of the pair of glasses. The corresponding protrusion on the right-hand lens module would be accommodated within a similar recess formed in the right-hand temple arm of the glasses.

Whilst the present invention is exemplified here by reference to a lens module, particularly a lens module for use in a pair of eyeglasses, it will be appreciated that the deformable membrane assembly of the present invention, such as the lens module of the present embodiment, may be used in a variety of different situations where a flexible membrane of adjustable shape is required, for instance in other kinds of optical apparatus, including mirrors, and in acoustic equipment, where a membrane of controllably adjustable shape may be required for use as an acoustic transducer, for example. Other applications of the deformable membrane of the invention will be apparent to those skilled in the art.

The cavity 20 formed by the front and rear retaining members 14, 15 accommodates a rear lens 22 that is shaped to be seated on a correspondingly shaped peripheral flange 17 formed on the rear retaining member 15. The rear lens 22 has a convex rear surface 23 and a concave front surface 24, forming a meniscus lens having a fixed, predetermined refractive power.

A flexible-dish shaped member 30 having a rear wall 32 and a peripheral side wall 33 which terminates in a front flange 35 is carried on the front surface 24 of the rear lens 22. In the present embodiments, the dish-shaped member 30 is made of a transparent thermoplastic polyurethane, such, for example, as Tuftane (available from Messrs. Permali Gloucester Ltd, Gloucester, UK, and is about 50 μm thick, but other suitable materials for the dish-shaped member 30 may be used—such for example as DuPont® boPET (bi-axially-oriented polyethylene terephthalate)—and the thickness adjusted accordingly. The rear wall 32 of the dish-shaped member 30 is bonded contiguously to the front surface 24 of the rear lens 22 by means of a transparent pressure-sensitive adhesive (PSA) such, for example, as 3M® 8211 adhesive. In the present embodiment, a layer of PSA of about 25μ thickness is used, but this may be varied as required.

The front flange 35 of the dish shaped member 30 carries a generally annular disc 40. As will be seen from FIG. 1 the disc 40 is not circular, but has the same outline shape as the rear lens 22 and the dish shaped member 30. The middle of the disc 40 is cut out as shown to leave a relatively wide, flat ring having a rear surface 42, which is bonded to the front flange 35 of member 30, and a front surface 44. The disc 40 serves as a bending control member of the kind described in co-pending international application no. PCT/EP2012/075549 and may be formed from any suitable material for the purpose such for example, as polycarbonate, nylon or glass. In the present embodiment, the disc 40 is formed from a sheet of polycarbonate having a thickness of about 0.25 mm.

In the lens module 10 of the present embodiment, the disc 40 is transparent, but this may not be essential in other embodiments; for example, non-optical embodiments. As best seen in FIGS. 1 and 2, the disc 40 comprises a large central aperture, such that it is of generally annular shape. The effect of the large central aperture is to decouple the bending of the disc 24 in the x and y directions to maintain substantially uniform out of plane bending stiffness of the disc 40 on the z-axis during actuation of the module 10, as described below.

The dish-shaped member 30 is sealingly adhered to the rear surface of the disc 40 using Loctite® 3555 adhesive, but suitable alternatives will be known to those skilled in the art.

The front surface 44 of the disc 40 is bonded to the rear face 62 of a membrane sub-assembly 69 which comprises front and rear bendable rings 50, 60 and an elastic membrane 70 that is sandwiched between the two rings 50, 60. The front and rear bendable rings 50, 60 have a similar shape to one another, which is also similar to the outer shape of the disc 40 and the front flange 35 of the dish shaped member 30. The membrane 70 likewise has the same shape and is held between the two rings 50, 60 under pre-tension. Any suitable adhesives maybe used for bonding the rear face 62 of the rear ring 60 to the front surface 44 of the disc 40, and for bonding the two rings 50, 60 to the membrane 70. Various suitable adhesives will be known to those skilled in art, but in the present embodiment Loctite® 3555 adhesive is used.

Each of the two rings 50, 60 is resiliently bendable and is suitably stamped from a sheet of stainless steel, although suitable resilient materials will be known to those skilled in the art such, for example, as titanium, glass and sapphire. The rings may have the same or different thicknesses in the range of about 0.1 mm to about 0.4 mm. In the present embodiment, the front ring 50 has a thickness of about 0.18 mm, while the rear ring 60 has a thickness of about 0.15 mm.

As best seen in FIG. 1 each of the rings is fabricated with a plurality of outwardly extending tabs 82. The tabs 82 on the front ring 50 are aligned with the tabs 82 on the rear ring 60, such that pairs of tabs 82 are disposed adjacent one another when the two rings 50, 60 are assembled with the membrane 70 between them, in effect to form a single, unitary tab.

The front ring 50 of the membrane sub-assembly 69 is shown in FIG. 5A. The tabs 82 are clearly shown and are designated as 82A, 82C or 82H as described below. The tabs 82 on the rear ring 60 are designated in the same way.

The tabs 82C and 82H extend outwardly from the rings 50, 60 and are trapped and held substantially immobile between the front and rear retaining members 14, 15, as best seen in FIG. 2. As will be seen from FIG. 1, the mating surfaces of the front and rear retaining members 14, 15 are formed with small recesses 18 to accommodate the tabs 82C, 82H.

Tabs 82A are not trapped between the front and rear retaining members 14, 15, but instead serve as actuation points on the rings 50, 64 actuating the module as described below.

Intermediate the tabs 82A, 82C, 82H the front and rear ring 50, 60 are unconstrained and may bend freely.

The membrane 70 is formed from a sheet of viscoelastic polymer material having a thickness in the range 75-300 µm. Suitably, the material used for the membrane should have a glass transition temperature below the usual operating range of the module 10, preferably below about −5° C., an elastic modulus in the range 5-50 MPa, and a good performance with regard to stress relaxation. For instance, the membrane should be capable of holding a tensile load of at least about 100 N/m for a period of at least 3-5 years. For optical applications, such as the lens module 10 of the present embodiment, the membrane 70 should also be optically clear and non-toxic. It must also be capable of being bonded to the rings 50, 60. Various suitable polymer materials will be known to those skilled in the art, including cross-linked urethanes, silicone elastomers (e.g. poly(dimethylsiloxane)), other thermoplastic polyurethanes, vinylidene chloride polymers (e.g. Saran®) or glass of suitable thickness.

In the present embodiment the membrane 70 is formed from a sheet of an aromatic polyether urethane such, for example as ST-3655 which is commercially available from Stevens Urethane, Easthampton, Mass., and has a thickness of about 260 µm.

The membrane 70 is pre-tensioned to a strain of up to about 33% and bonded to the rings 50, 60 such that it is stably supported around its edge. In the present embodiment, the membrane 70 is adhered to the front and rear rings 50, 60 using Loctite® 3555 adhesive. The membrane 70 should form a fluid-tight seal with at least the rear ring 60.

As shown in FIG. 2 the front retaining member 14 carries a front lens 26 having a rear surface 27 that faces inwardly into the cavity 20 and a front face 28. In some embodiments, the front lens 26 may be replaced by a simple, plain cover plate having no refractive power. The front retaining member 14 is shaped to provide a chamfered inner surface 15 that serves to support the front lens 26, which may be retained in place by a suitable bezel (not shown) forming part of the frame of the eyeglasses.

As best seen in FIG. 2, in the assembled module 10, the membrane sub-assembly 69 "floats" freely in the cavity 20 supported on the flexible side wall 33 of the dish-shaped member 30, except where it is joined to the housing 12 by the tabs 82C, 82H and to an actuating mechanism (not shown) by the tabs 82A, as described below. The front ring 50 is disposed rearwardly out of and does not impinge on the front lens 26.

The dish-shaped member 30 and the membrane 70 form a sealed envelope which is filled with a non-compressible fluid 90. For use in the lens module 10 of the present embodiment, the fluid 90 should suitably be liquid over the range of operating temperatures for the lens module 10 (typically −5° C. to 50° C.), colourless, non-toxic and have a high refractive index and low optical dispersion. Preferably the fluid 90 should also be odourless. Various suitable fluids will be known to those skilled in art including high refractive index siloxane oils, but in the present embodiment, silicone oil is used, e.g., DC-705 diffusion pump fluid available from Dow Corning Corporation of Midland, Mich. It will be appreciated that for other types of assembly, for example mirrors and non-optical applications, it may be unnecessary for the fluid to have such optical characteristics, although other requirements may apply.

Figure 3:
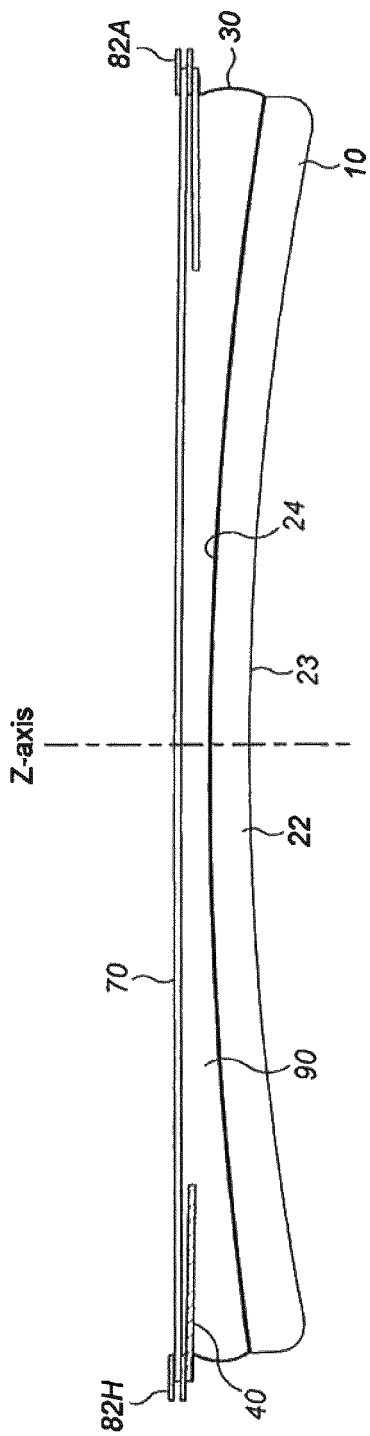
FIG. 3 is a sectional view that is similar to FIG. 2, but omits the front and rear retainers and front lens of the module for clarity.
Figure 4:
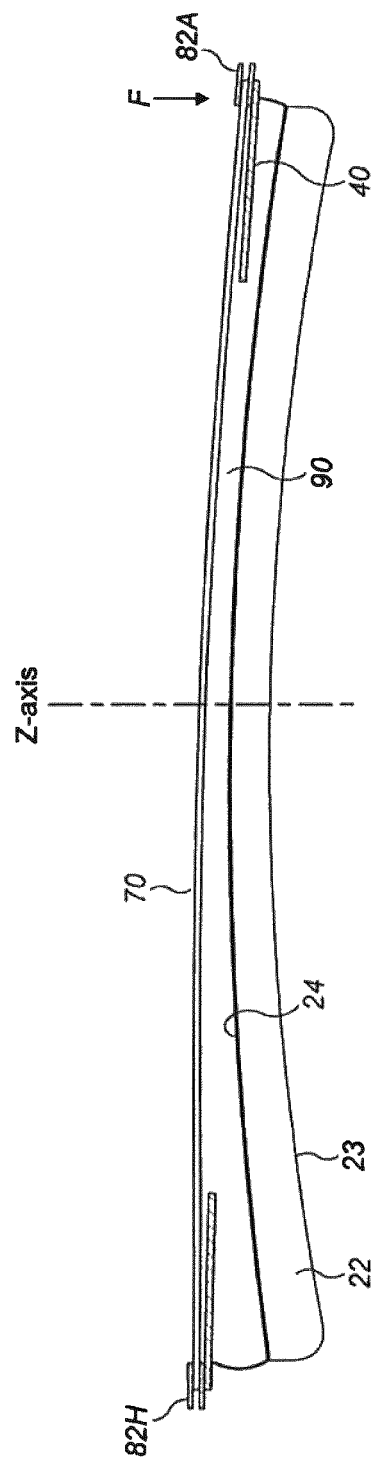
FIG. 4 is a sectional view that is similar to FIG. 3, but shows the module in an actuated state.

FIG. 3 shows the lens module 10 of the present embodiment with the front and rear retaining members 14, 15 and the front lens 26 removed for clarity. It will be appreciated that the envelope formed by the dish-shaped member 30 and membrane 70 form a resilient, cushion-like structure, with a substantially rigid rear wall formed by the rear lens 22. The envelope comprises a constant volume of fluid 90 and, by dint of the flexible side wall 33 of the member 30, is compressible. If the envelope is compressed, for example by squeezing one side of the envelope against the rear lens 22 in the direction of the arrow F as shown in FIG. 4, the pressure of fluid in the envelope is increased, causing the membrane 70 to distend outwardly relative to the envelope. As it distends outwardly, the curvature of the membrane 70 increases, thereby increasing the refractive power of the surface formed by the membrane 70.

The locus of displacement of each point on the membrane 70 defines a z-axis, as indicated in FIGS. 3 and 4. The point of greatest displacement on the z-axis, which forms the vertex of the surface defined by the membrane 70 when actuated, is indicated at the point OC. For lenses and mirrors, such as the lens module 10 of the present embodiment, the vertex OC corresponds to the optical centre of the lens or mirror.

Upon releasing the actuating force F, the envelope tends naturally to return to its lowest energy configuration, with the side wall 33 of the member 30 relaxed and the membrane 70 at its minimal curvature configuration.

In some embodiments, the module 10 may be configured such that when the envelope is relaxed (un-actuated) with the fluid pressure at its minimum, the membrane 70 is substantially flat. However, in the present embodiment, the membrane has a slight curvature (approximately 0.5 dioptres) in the un-actuated position as a result of the volume of fluid 90 used to over-fill slightly the envelope. It has been found that this helps to prevent the front and rear rings 50, 60 from spontaneously adopting undesired bending modes that would result in distortion in the form of the membrane.

Where the deformable membrane of the present invention is used for lens applications, including the lens module 10 of the present embodiment, it is desirable that the components falling within the field of view should have the same or substantially the same refractive index. Thus, in the lens module of the present embodiment, the polycarbonate disc 40, the membrane 70 and the fluid 90 preferably all have the same or similar refractive index, so that the disc 40 is substantially invisible to the user.

Any suitable mechanism for actuating the lens module 10 may be employed, and specific actuating mechanisms are disclosed in PCT/GB2012/051426, PCT/EP2012/075549 and PCT/GB2013/050747. As mentioned above, in the lens module 10 of the present embodiment, the tabs 82 designated 82A serve as actuation points and are connected to an actuating mechanism (not shown) that is at least partially accommodated within the housing 12, including the protrusion 16. The actuating mechanism may be operated manually or automatically and, upon actuation, serves to apply an actuating force to the membrane sub-assembly 69 through the tabs 82A. As described in more detail below, the lens module 10 of the present embodiment comprises two such actuation tabs 82A, but in other embodiments there may be only one or more than two. Where a plurality of actuation tabs 82A is provided, these may be displaced by the actuating mechanism to the same or different degrees according to the desired actuated membrane form.

In accordance with the present invention, upon actuation, the membrane 70 adopts a predefined form. In the case of the lens module 10 of the present embodiment, the predefined form is a lens surface suitable for optometric use. Thus, the membrane should deform in accordance with one or more Zernike polynomials to provide a lens surface suitable for the correction of refractive disorders, including astigmatism. Depending on the desired prescription, the membrane 70 may be required to deform purely spherically according to the second order Zerike polynomial $Z_2^0$, but commonly the required membrane form may comprise one or more other second, third, fourth or higher order Zernike polynomial components to correct defects such as astigmatism. Since the boundary of the membrane 70 is non-circular, the rings 50, 60 must bend on the z-axis in a manner that corresponds to the predefined form of the membrane.

Figure 5C:
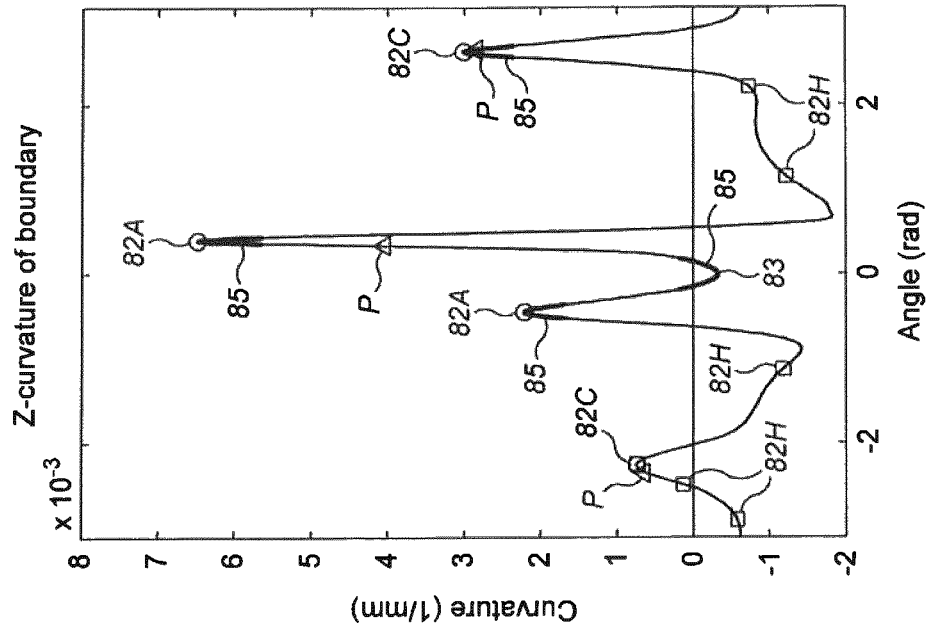
FIG. 5C is a graph showing the variation in curvature of the front ring of FIG. 5A when the lens module is actuated.
Figure 5B:
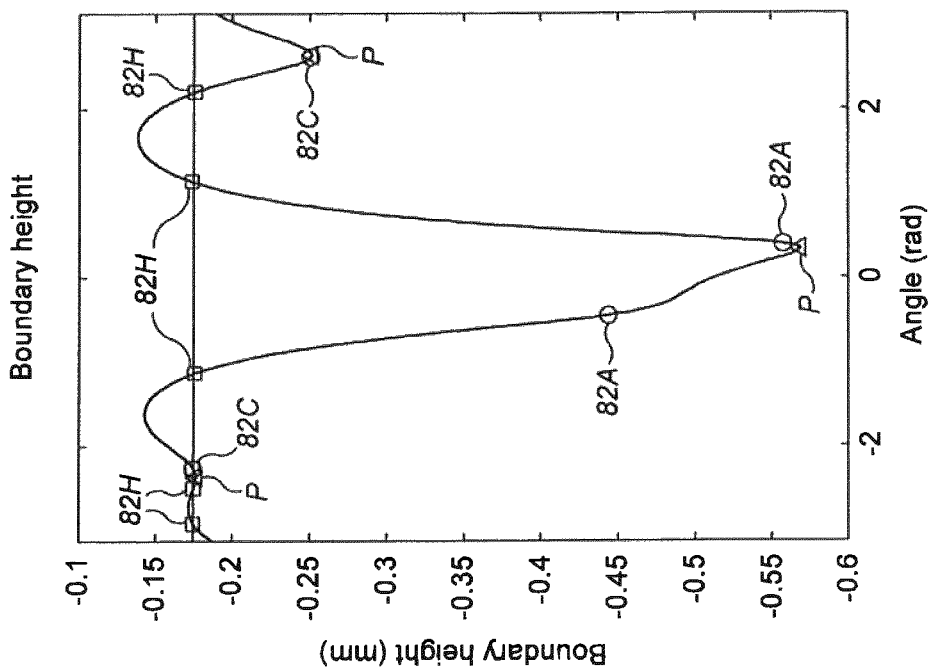
FIG. 5B is a graph showing the variation in amplitude of the front ring of FIG. 5A when the lens module is actuated.
Figure 6A:
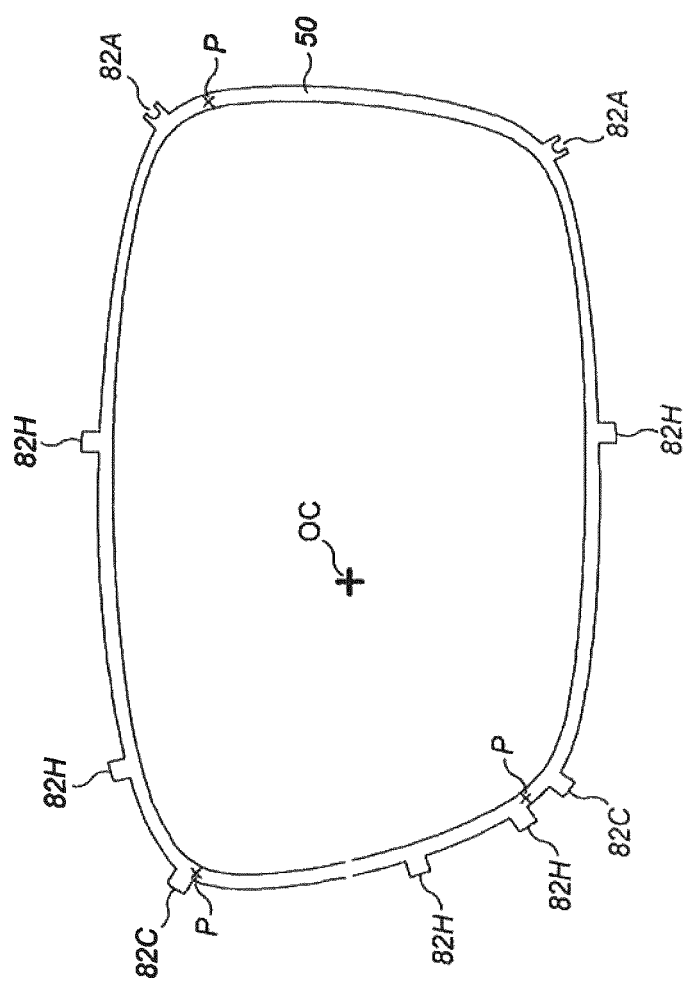
Figure 6C:
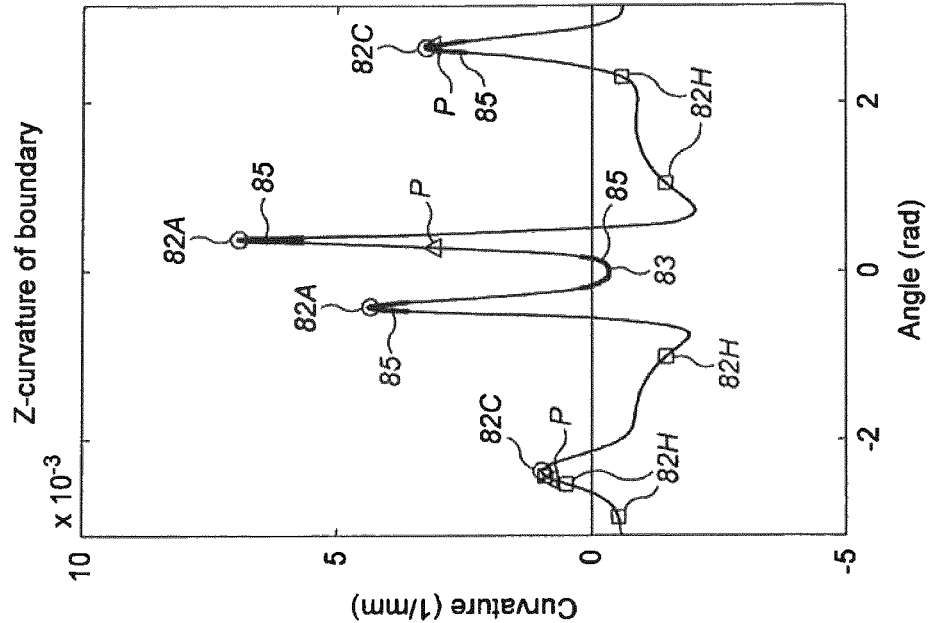
Figure 6B:
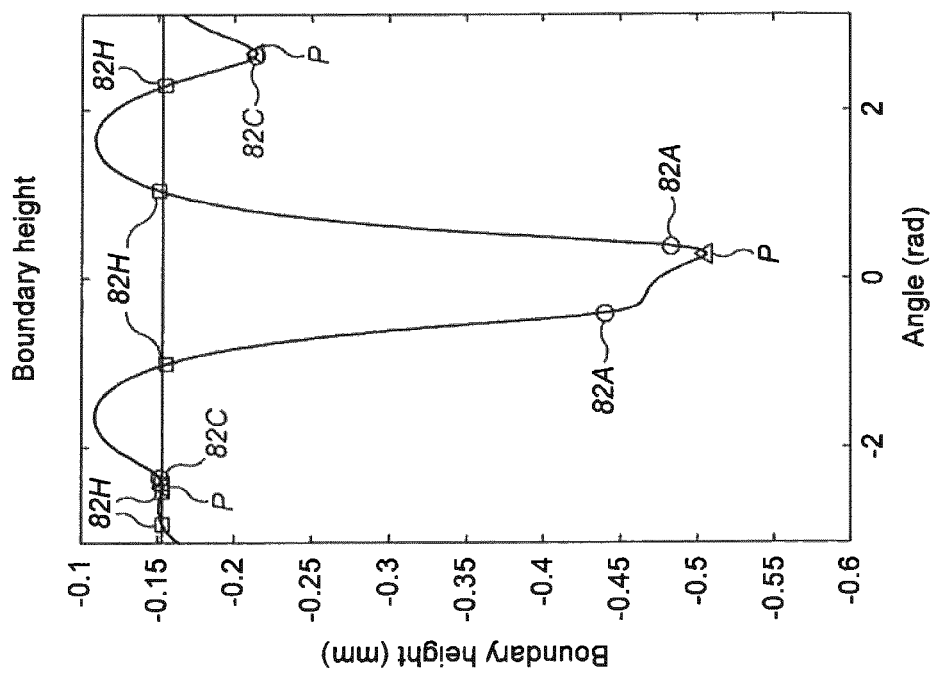
Figure 7A:
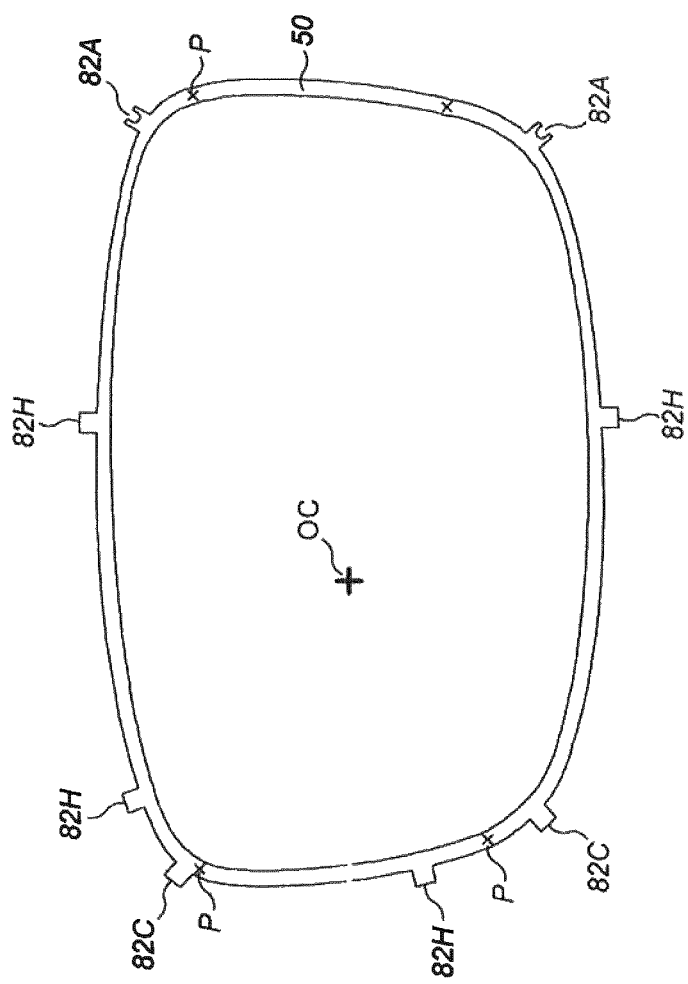
Figure 7C:
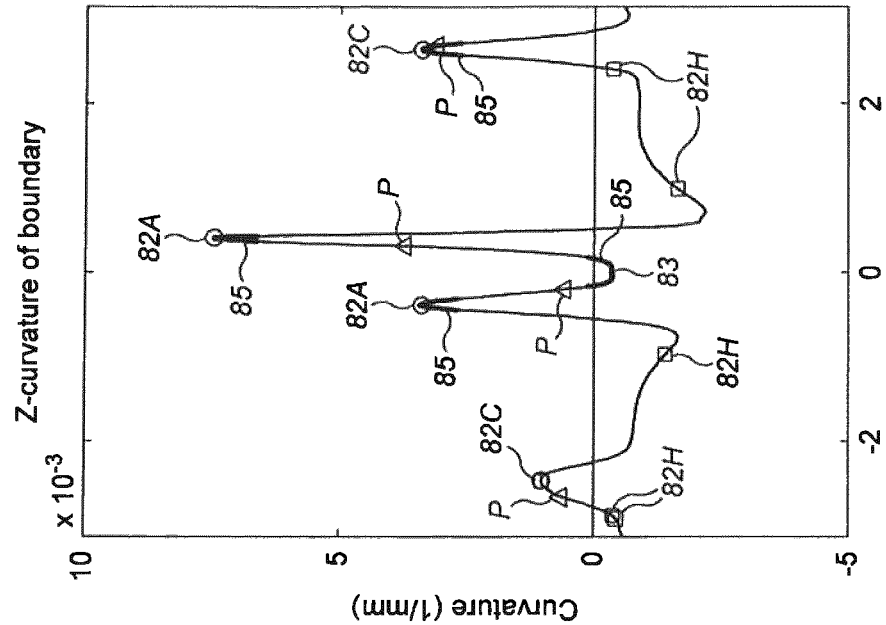
Figure 7B:
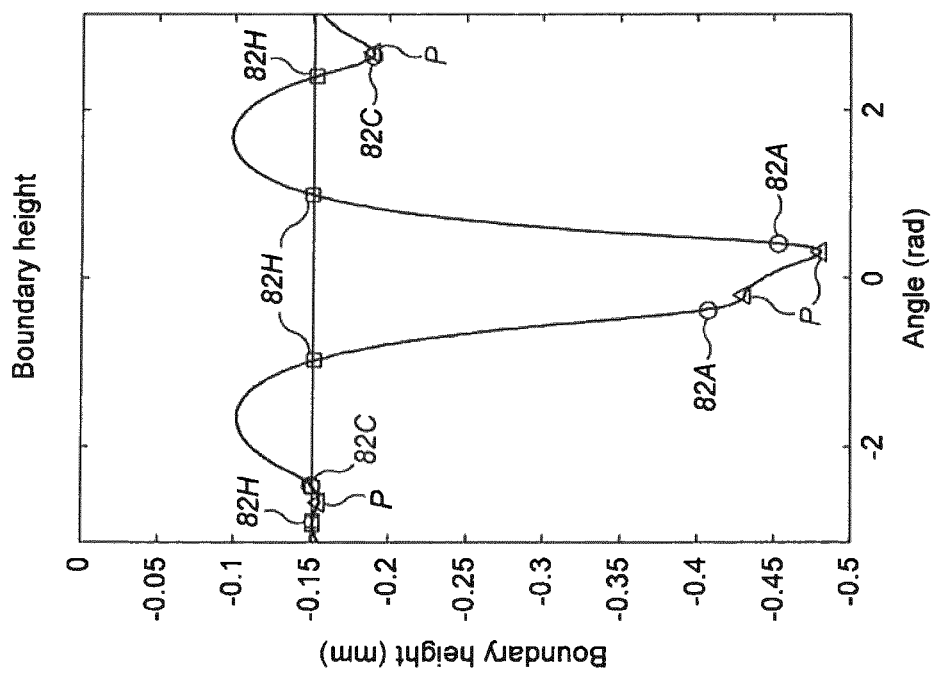
Figure 8C:
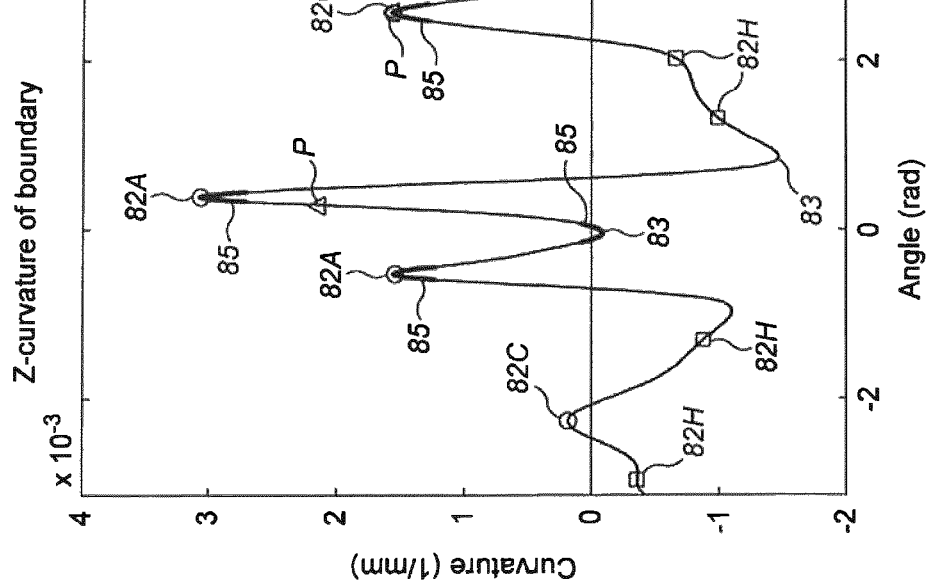
Figure 8B:
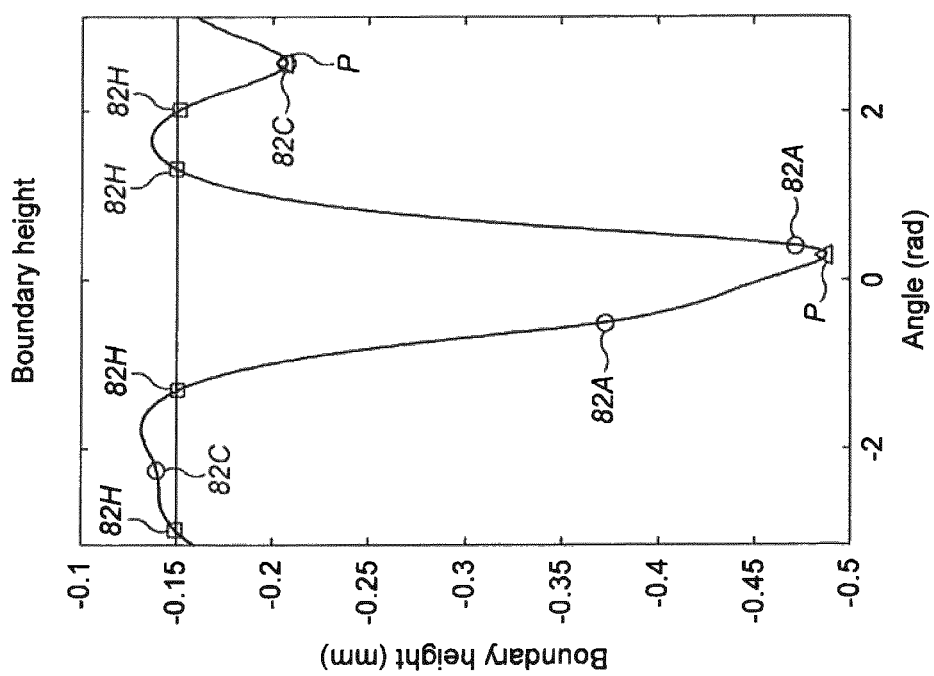
Figure 9C:
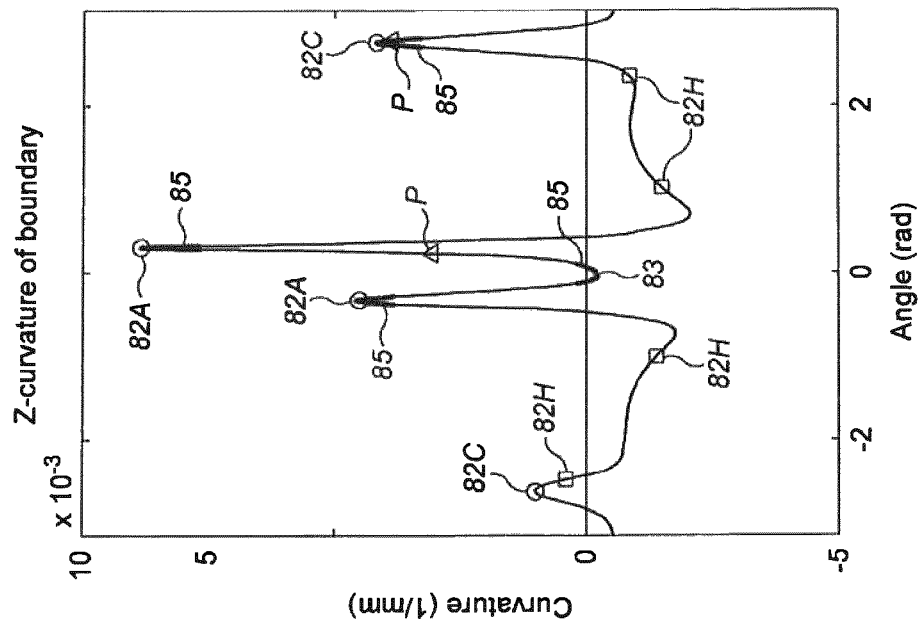
Figure 9B:
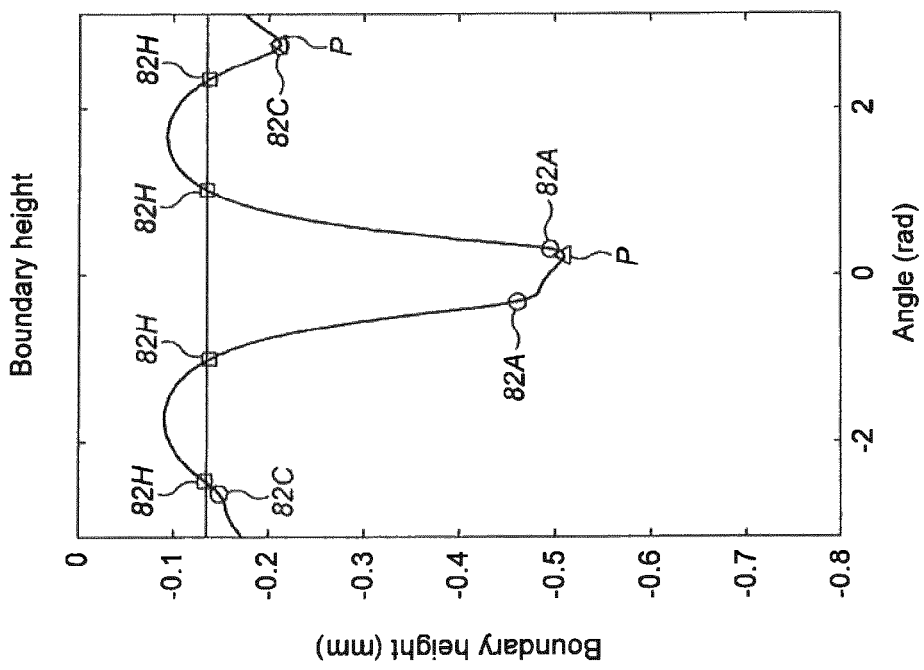
Figure 10C:
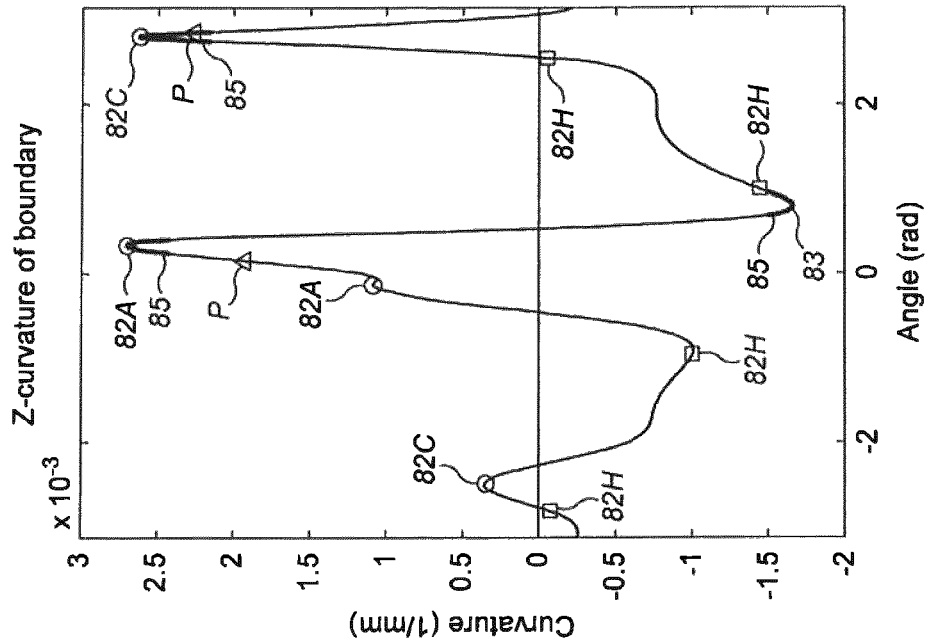
Figure 10B:
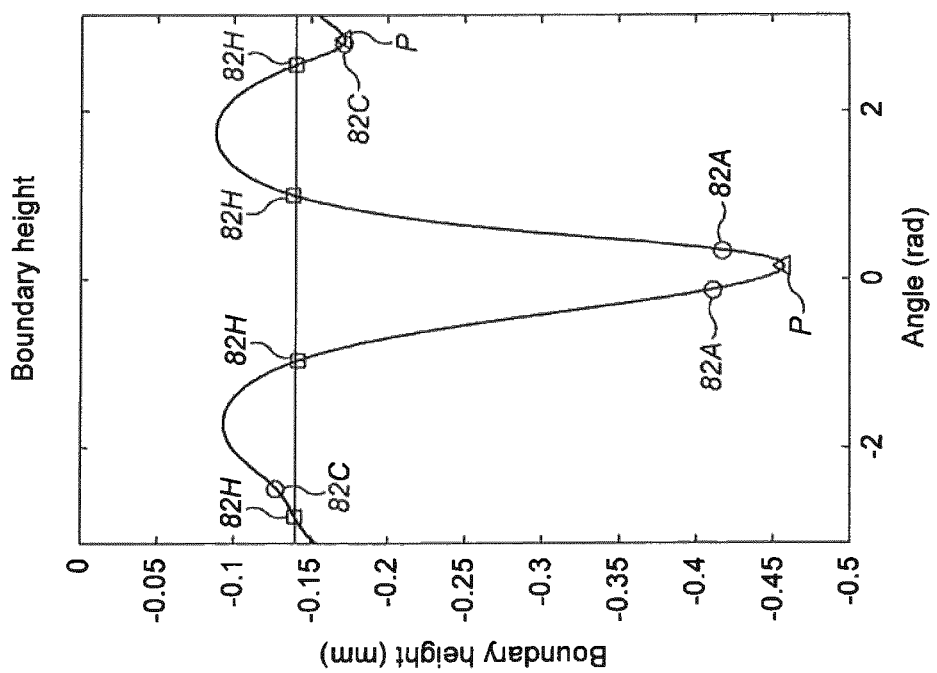
Figure 11C:
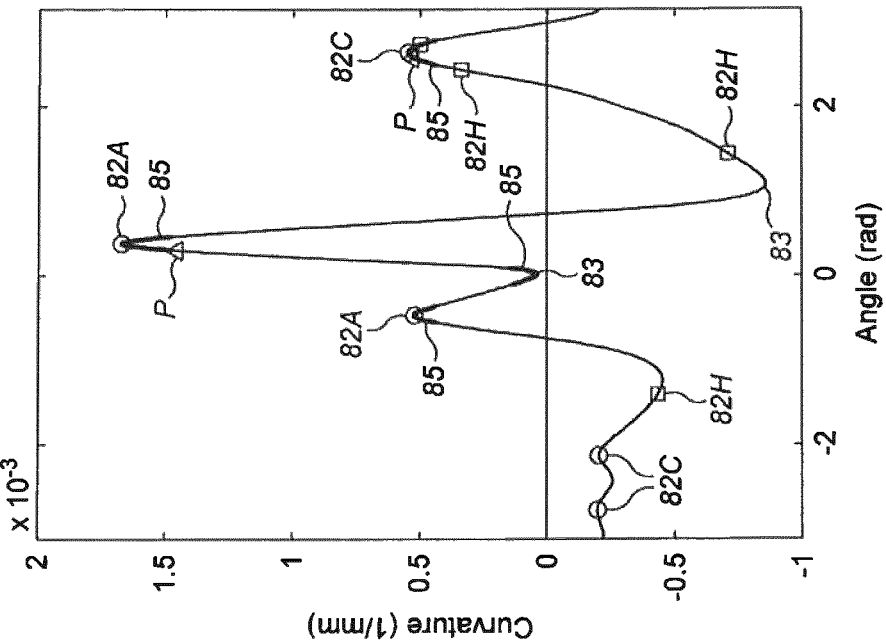
Figure 11B:
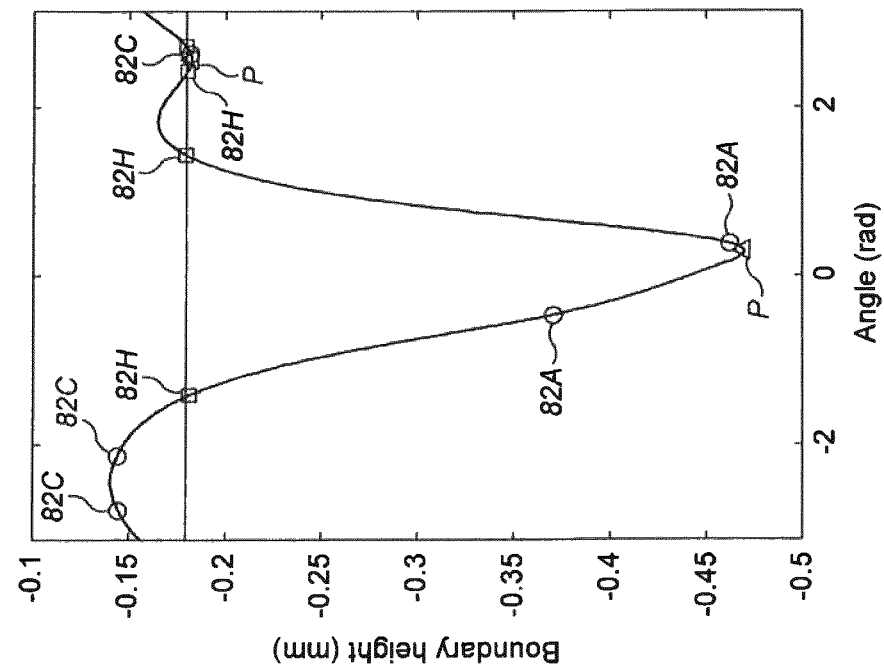
Figure 12C:
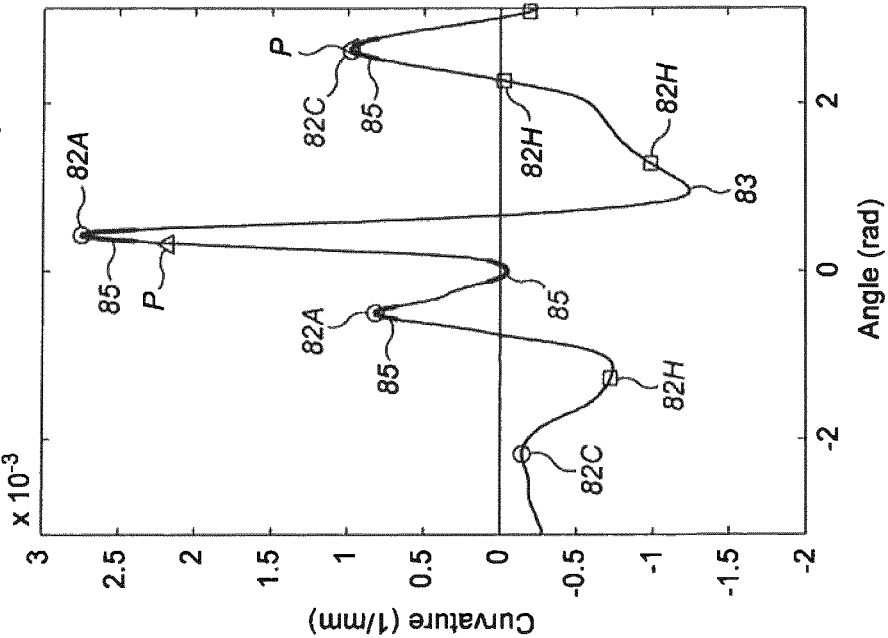
Figure 12B:
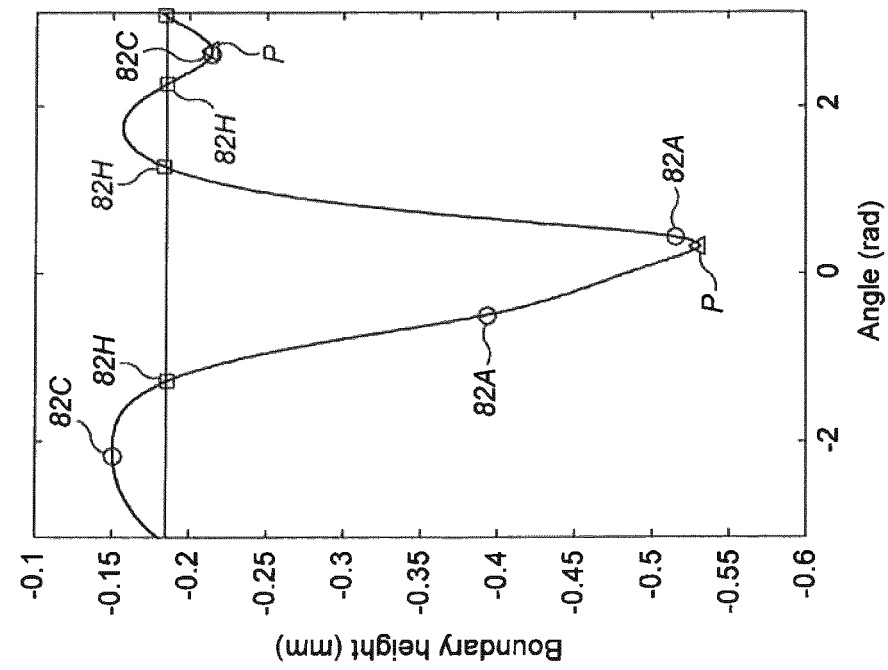

FIG. 5B shows the variation in the amplitude of the boundary of the membrane 70 (and therefore the rings 50, 60) on the z-axis when the lens module 10 is distended. When the module 10 is actuated, and the fluid pressure in the envelope is adjusted, a force is applied to the rings 50, 60 at each of the tabs 82. In the case of the tabs 82A the force is applied actively by the actuating mechanism for controlling the position of the membrane sub-assembly 69 relative to the fixed back wall of the envelope formed by the rear lens 22. Through the other tabs 82C, 82H a reaction force is applied to the rings 50, 60. According to the disclosure of PCT/GB2012/051426, a control point, i.e. in the present embodiments a position on the rings 50, 60 where the rings are coupled to the housing 12 through tabs 82, should be situated at or proximate to each point round the rings 50, 60 where the ring profile that corresponds to the desired actuated form of the membrane 70 exhibits a turning point in the direction of the force applied through the tab 82 to the rings 50, 60 between two adjacent points where the profile of the ring exhibits an inflection point or a turning point in the opposite direction. These points are indicated in FIG. 5B by the letter "P" (prior art)

In accordance with the present invention however control points/tabs 82 are not situated at points round the rings 50, 60 of maximum amplitude in the direction of the force applied to the rings 50, 60 when actuated, but instead are situated at or near the points round the rings of locally maximum or minimum curvature in the direction opposite to the direction of the force applied at those points. Most commonly, the tabs 82 are positioned at or proximate the points of locally maximum curvature in the direction of distension of the membrane 70—as in the present embodiments—, but in other embodiments tabs 82 may also be situated at or proximate some or all of the points of locally minimum curvature in the direction of membrane distension (locally maximum curvature in the direction opposite the direction of membrane distension), e.g. as indicated at points 83 in FIGS. 5C-12C of the accompanying drawings.

FIG. 5C shows the variation in curvature of the boundary of the membrane 70 when distended, and the locations of the control points at the points of locally maximum curvature are indicated by the reference numerals 82A and 82C. The actuation tabs 82A are located at the points indicated by 82A, and further control tabs 82C are located at points 82C. It has been found that locating the tabs 82A and 82C at control points where the boundary of the membrane 70 exhibits locally maximum or minimum curvature or is close to the point of locally maximum or minimum curvature, instead of maximum amplitude, when distended affords more accurate control over the shape of the membrane 70.

Most suitably the tabs 82 are positioned at or proximate to the points of locally maximum or minimum curvature, but in some embodiments, that may not be practical for various reasons, including design and packaging constraints. Accordingly in some embodiments, one or more of the tabs 82 may be situated in the vicinity of the point of locally maximum or minimum curvature. For instance, the actual position of the tab 82 may be within 10% or 5%, or preferably within 1%, of the point of locally maximum or minimum curvature as a fraction of the total periphery of the membrane 70 where it is held by the supporting members 50, 60.

Expressed another way, the curvature at the actual location of the tab 82 in the required profile of the rings 50, 60 must be within a certain fraction of the local peak height, e.g. 99%, 90%, 75% or 66%, where the peak height is measured from the peak to the bottom of the shallower of the valleys on either side of the peak.

The tolerance in the actual position of the tabs 82 is shown in FIGS. 5C-12C by the bold line sections.

It will be appreciated that the lens module 10 of the present embodiment operates by compression using a fixed volume of fluid 90; the actuation tabs 82A being coupled to the actuating mechanism (not shown) for compressing the envelope to adjust the fluid pressure therein. However, in other embodiments the fluid pressure may be controlled by adjusting the volume of fluid within the envelope. In such embodiments, no actuation tabs are used, but control tabs 82C should still be located at or near each point around the boundary of the membrane 70 where the boundary exhibits locally maximum or minimum curvature when distended to achieve the desired predefined form of the membrane 70.

In addition, as disclosed in PCT/GB2013/050747, additional tabs 82H may be positioned round the rings 50, 60 at or near points of zero displacement when the assembly is actuated. It will be appreciated that in the case of an assembly in which the membrane 70 is required to deform spherically, the additional tabs 82H will be positioned round the rings 50, 60 at or near points that are substantially equidistant from the vertex OC. Suitably fixing the boundary of the membrane 70 at the location of the tabs 82H—called "hinge points"-permits the membrane 70 to adopt the desired bending mode(s)—for instance the shape defined by the desired superposition of Zernike polynomial(s)—, but fixing the position of the bendable rings 50, 60 at the locations of the tabs 82H relative to the housing 12 helps to prevent them from spontaneously adopting unwanted bending modes that have at least one node on the boundary as a result of the surface tension in the membrane 70.

In the lens module 10 of the present embodiment, five hinge points 82H are provided, together with the two actuation points 82A mentioned above and two further control points 82C.

Between the tabs 82 the rings 50, 60 are unconstrained and may bend freely when the module 10 is actuated. However, since the boundary of the membrane 70 is required to adopt a profile that depends on to the predefined form of the membrane 70 when distended, the rings 50, 60 should bend in a predetermined manner between the tabs 82, and to achieve this the bending stiffness of the rings 50, 60 is varied round their extent as disclosed by PCT/GB2012/051426 and PCT/GB2013/050747. As mentioned above, in the lens module 10 of the present embodiment, the rings 50, 60 are each stamped from a sheet of metal of substantially constant thickness. In order to achieve the variation in bending stiffness round the rings 50, 60 therefore the width of the rings is varied round their extent. The required variation in width may be determined in accordance with the methods described in detail in PCT/GB2012/051426 and PCT/GB2013/050747 using finite element analysis. Those methods need not be repeated herein.

As is known in the art, lenses for eyeglasses are typically offered in a range of different lens shapes such, for example, as oval, semi-oval, rectangular, wayfarer, aviator, navigator, half-eye, cat-eye, semi-cat-eye, octagon, hexagon, pentagon, semi-square, etc. The rings 50, 60 illustrated in FIGS. 1 and 5A provide one particular lens shape, but the principles of the present invention may easily be adapted for any other lens shape to achieve a membrane of the desired actuated form. Thus, by way of illustration, and without intending to limit the scope of the present disclosure, front rings 50 corresponding to alternative lens shapes are shown in FIGS. 6A-12A. For ease of reference, the same reference numerals are used in FIGS. 6A-12A, 6B-12B and 6C-12C as used in FIGS. 5A-C, but it will be understood that when used in a lens module, the other components of the module might also need to be adapted to the new shape.

For each of the alternative lens shapes shown in FIGS. 6A-12A, the corresponding variations in boundary height of the rings 50, 60 when actuated are shown in FIGS. 6B-12B, while the variations in curvature of the rings 50, 60 are shown in FIGS. 6C-12C. For each lens shape, the required positions of the actuation tabs 82A and control tabs 82C are shown, as well as positions of the optional hinge tabs 82H to procure additional stabilisation of the rings 50, 60 under the pre-tension in the membrane 70. In each of these figures, the positions of the control points P according to PCT/GB2012/051426 are also shown for comparison.

The invention claimed is:

1. A deformable membrane assembly comprising a deformable membrane in contact with a body of fluid and a selectively operable adjuster for adjusting the pressure of the fluid for causing distension of the membrane in accordance with a predefined form, the membrane being held peripherally by a bendable supporting member that is coupled to a fixed support by at least three engaging members at spaced locations round the supporting member, there being an engaging member provided at or proximate at least one point round the supporting member where the profile of the supporting member corresponding to the predefined form of the membrane exhibits locally maximum or minimum curvature in the direction of distension of the membrane.

2. A deformable membrane assembly as claimed in claim 1, wherein there is an engaging member provided at or proximate at least one point round the supporting member where the profile of the supporting member corresponding to the predefined form of the membrane exhibits locally maximum curvature in the direction of distension of the membrane.

3. A deformable membrane assembly as claimed in claim 2, wherein there is an engaging member provided at or proximate two or more points round the supporting member where the profile of the supporting member corresponding to the predefined form of the membrane exhibits locally maximum curvature in the direction of distension of the membrane.

4. A deformable membrane assembly as claimed in claim 1, wherein there is an engaging member provided at or proximate at least one point round the supporting member where the profile of the supporting member corresponding to the predefined form of the membrane exhibits locally minimum curvature in the direction of distension of the membrane.

5. A deformable membrane assembly as claimed in claim 1, wherein the body of fluid is contained within an envelope, one wall of which is formed by the deformable membrane, and the adjuster is operable for selectively adjusting the volume of fluid within the envelope.

6. A deformable membrane assembly as claimed in claim 1, wherein the body of fluid is contained within a compressible or expandable envelope, one wall of which is formed by the deformable membrane, and the adjuster is operable for selectively compressing or expanding the envelope to cause distension of the deformable membrane.

7. A deformable membrane assembly as claimed in claim 6, wherein at least one of the engaging members is connected to the adjuster for displacing the supporting member at or proximate the respective point of locally maximum or minimum curvature relative to the fixed support for compressing or expanding the envelope.

8. A deformable membrane assembly as claimed in claim 1, wherein at least one of the engaging members is arranged to hold the supporting member substantially stationary at or proximate the respective point of locally maximum or minimum curvature.

9. A deformable membrane assembly as claimed in claim 1, wherein the supporting member comprises a bendable ring.

10. A deformable membrane assembly as claimed in claim 9, wherein at least one of the engaging members comprises a tab protruding from the ring.

11. A deformable membrane assembly as claimed in claim 9, wherein the bending stiffness of the ring varies round its extent in order to control the bending of the ring in response to distension of the membrane.

12. A deformable membrane assembly as claimed in claim 1, wherein said predefined form is defined by a superposition of one or more Zernike polynomials.

13. A deformable membrane assembly as claimed in claim 1, wherein the edge of the membrane where it is held by the supporting member is non-circular.

14. A deformable membrane assembly as claimed in claim 1, wherein at least one of the engaging members is located at a point round the supporting member that is substantially stationary as the membrane is distended.

15. A deformable membrane assembly as claimed in claim 1, wherein the membrane is distended when the pressure of the body of fluid is a minimum.

16. A deformable membrane assembly as claimed in claim 1, wherein the membrane is distended to form a surface having a refractive power in the range 0.1-1.0 dioptres, when the pressure of the body of fluid is at its minimum.

17. A deformable membrane assembly as claimed in claim 1, wherein the membrane has a vertex when distended, two or more engaging members being positioned at or near points round the supporting member that are substantially equidistant from the vertex.

\* \* \* \* \*